April 29, 1969

R. C. BUELER 3,441,318

CONTROL VALVE

Filed Jan. 25, 1968

INVENTOR
RICHARD C. BUELER
BY
*Joseph E. Papino*

April 29, 1969  R. C. BUELER  3,441,318
CONTROL VALVE

Filed Jan. 25, 1968  Sheet 2 of 2

INVENTOR
RICHARD C. BUELER
BY
Joseph E. Pagin

United States Patent Office 3,441,318
Patented Apr. 29, 1969

3,441,318
CONTROL VALVE
Richard C. Bueler, Glendale, Mo., assignor to Wagner Electric Corporation, Newark, N.J., a corporation of Delaware
Filed Jan. 25, 1968, Ser. No. 700,513
Int. Cl. B60t 13/00, 15/46; G05d 11/00
U.S. Cl. 303—6
32 Claims

ABSTRACT OF THE DISCLOSURE

A control valve having a pair of opposed proportioning members to effect metered applications through said control valve of separate fluid pressures supplied thereto, and warning means biased between said proportioning members for metering engagement therewith and movable toward opposed translated warning positions in response to a predetermined differential between the magnitudes of the separately supplied fluid pressures acting thereon.

---

Figure 2:
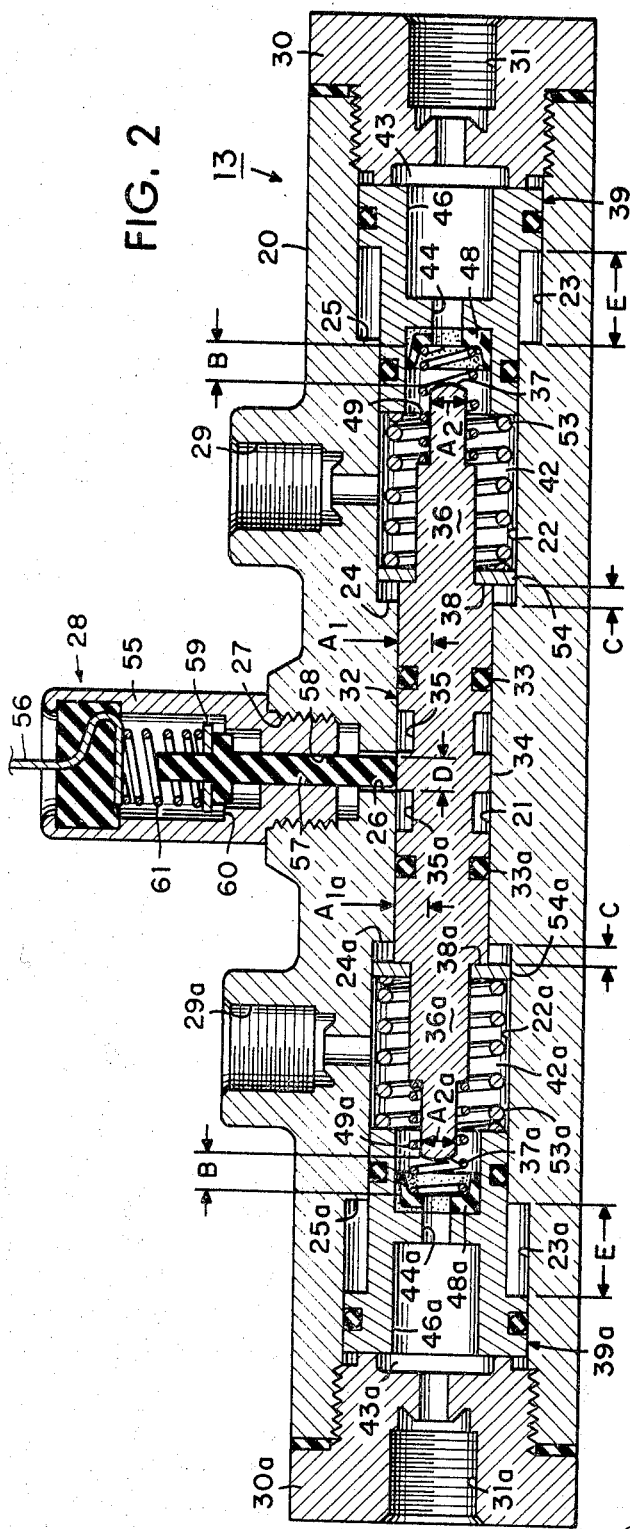

This invention relates in general to dual or split fluid pressure systems and in particular to control valves for controlling pressure fluid flow through each of said dual systems.

In the past, horizontally split brake systems were utilized on vehicles wherein each of the brakes of the front and rear vehicle axle sets was provided with separate wheel cylinders or motors for braking purposes, and one of said wheel cylinders of each front and rear axle set of brakes was connected in one system branch with one fluid pressure generating chamber of a split system type master cylinder while the other of said wheel cylinders was connected in the other of the system branches with the other fluid pressure generating chamber of said split master cylinder. Further, prior art control valves for such horizontally split systems provided separate proportioning members for respectively proportioning the separate fluid pressures supplied thereto from the split master cylinder to the wheel cylinders of the rear axle set of brakes and also provided an indicator member movable toward opposed translated positions to energize a driver warning circuit upon the occurrence of a predetermined differential between the magnitudes of the separate fluid pressures generated in the separate system branches. One of the disadvantageous or undesirable features of such past control valves for horizontally split systems was that the proportioning members and warning members were separate entities disassociated from each other which served to complicate said control valve and increase the cost thereof. Another disadvantageous or undesirable feature of such past control valve, which emanates from the aforementioned disadvantageous feature, was that the inherent characteristics of the proportioning members and the warning member were not compatibly combined to effect a simplified structure. Further, upon the failure of one of the separate fluid pressures supplied to such past control valves, the other or established fluid pressure was bypassed or shunted around the one proportioning member which controlled the application of the established separately supplied fluid pressure through said control valve thereby obviating the proportioning function of said one proportioning member; therefore, the established separately supplied fluid pressure was applied to the wheel cylinders of the functioning system branch when said one proportioning member was bypassed. It is apparent that the braking effort was proportionally reduced upon the failure of the one separately supplied fluid pressure, and when the established separately supplied fluid pressure in the functioning system branch was increased to re-establish the desired braking effort, the bypassed or one proportioning member in the functioning system branch was unavailable to thereafter proportion further increases in the established separately supplied fluid pressure necessary to re-establish the desired braking effort. Therefore, still another disadvantageous or undesirable feature of such past control valves was their inability to proportion the increased established separately supplied fluid pressure in the functioning system branch effected to reestablish the desired or predetermined braking effort upon the occurrence of a failure of the separately supplied fluid pressure in the other system branch.

The principal object of the present invention is to provide a control valve which overcomes or obviates the aforementioned disadvantageous or undesirable features, as well as others, and this and other objects and advantageous features of the present invention will become apparent hereinafter.

Briefly, the invention comprises a control valve having indicating means movable therein toward opposed translated positions in response to a predetermined differential between separate fluid pressures supplied thereto and biased between a pair of proportioning means for metering engagement therewith to control the application through said control valve of the separately supplied fluid pressures.

Figure 1:
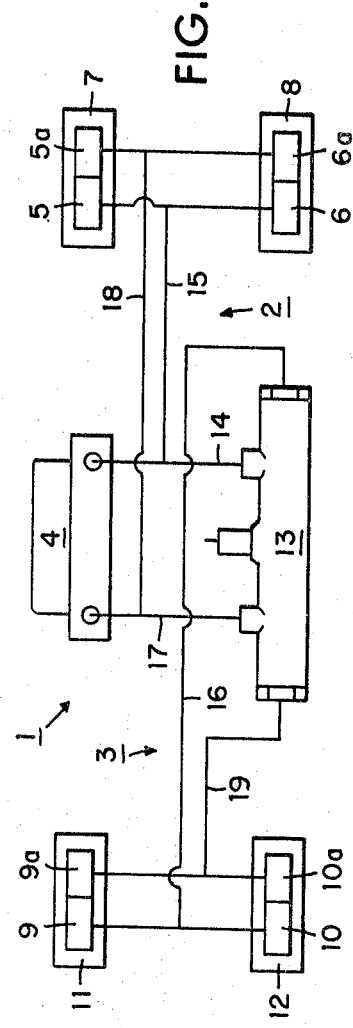
Figure 3:
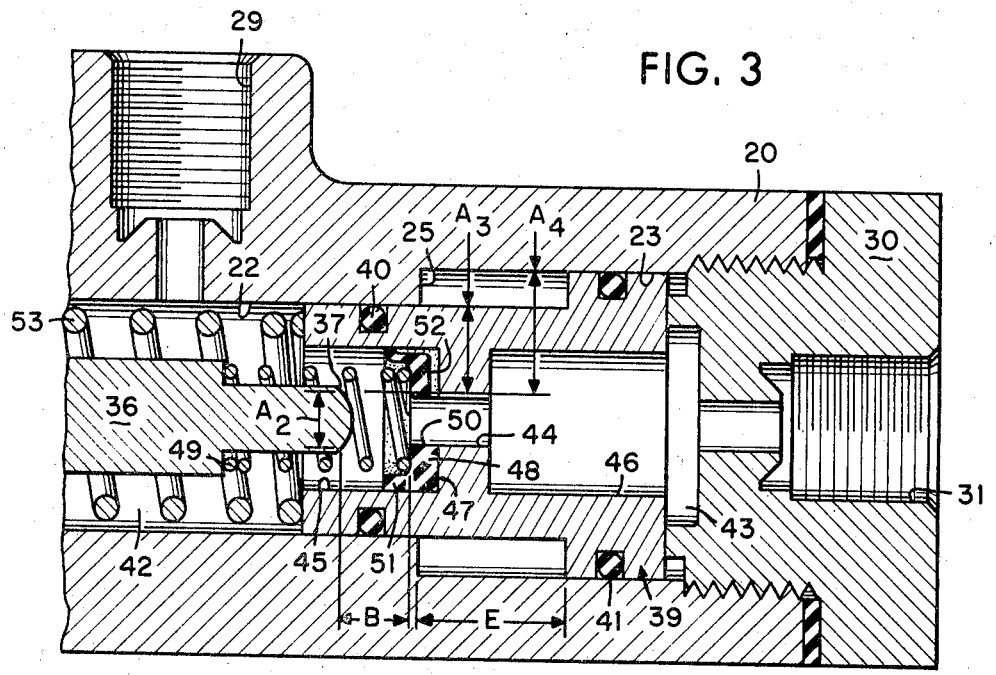
Figure 4:
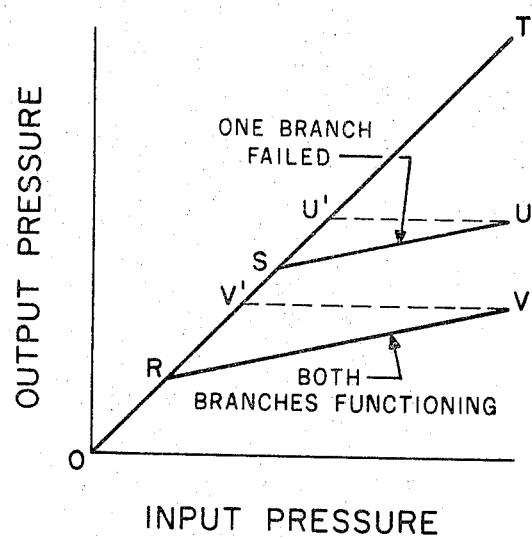

In the drawings which illustrate an embodiment of the invention,

FIG. 1 is a schematic diagram of a horizontally split fluid pressure system showing a control valve embodying the present invention therein, FIG. 2 is an enlarged sectional view showing an embodiment of the control valve of FIG. 1 in cross-section, FIG. 3 is an enlarged fragmentary view showing the rightward proportioning piston of the control valve of FIG. 2 in cross-section, and FIG. 4 is a graphical representation of the input and output pressures for the control valve of FIG. 2.

Referring now to the drawings and in particular to FIG. 1, a horizontally split fluid pressure system 1 is provided with separate branches 2, 3 connected between the separate primary and secondary fluid pressure generating chambers (not shown) of a tandem or split system master cylinder 4 and between fluid pressure responsive motors or split wheel cylinders 5, 5a and 6, 6a of the front axle set of friction devices or brakes 7, 8 and fluid pressure responsive motors or split wheel cylinders 9, 9a and 10, 10a of the rear axle set of friction devices or brakes 11, 12, and a control valve 13 is interposed in said branches. In the branch 2, a conduit 14 is connected between one fluid pressure generating chamber of the split master cylinder 4 and an inlet port of the control valve 13, and another conduit 15 has one end intersecting the conduit 14 while the other end thereof branches to connect with the wheel cylinders 5, 6 of the front brakes 7, 8. To complete the description of the branch 2, another conduit 16 has one end connected with an outlet port of the control valve 13 while the other end thereof branches to connect with the wheel cylinders 9, 10 of the rear brakes 11, 12. In the branch 3, a conduit 17 is connected between the other fluid pressure generating chamber of the split master cylinder 4 and another inlet port of the control valve 13, and another conduit 18 has one end intersecting with the conduit 17 while the other end thereof branches to connect with wheel cylinders 5a, 6a of the front brakes 7, 8. To complete the description of the branch 3, another conduit 19 has one end connecting with another outlet port of the control valve 13 while the other end thereof branches to connect the wheel cylinders 9a, 10a of the rear brakes 11, 12.

Referring now to FIGS. 2 and 3, the control valve 13 is provided with a housing 20 having a bore 21 therein interposed between opposed stepped counterbores 22, 23 and 22a, 23a, and opposed shoulders 24, 24a and 25, 25a are respectively defined between said bore and said counterbores 22, 22a and between said counterbores 22, 23 and 22a, 23a. A cross-bore 26 is also provided in the housing 20 having one end intersecting the bore 21 adjacent the midportion thereof while the other end thereof connects with a threaded cross-bore 27 which is provided to receive an electrical switch indicated generally at 28, to be discussed hereinafter. Inlet ports 29, 29a, which respectively receive conduits 14, 17, as previously mentioned, are provided in the housing 20 intersecting the counterbores 22, 22a adjacent to their midportions, and closure members or end plugs 30, 30a are threadedly received in the open ends of the counterbores 23, 23a. Outlet ports 31, 31a, which receive conduits 16, 19, as previously mentioned, are respectively provided in the closure members 30, 30a and connect with the counterbores 23, 23a.

An indicator or switch actuating member, such as the piston 32, is slidably received in the bore 21 and carries spaced peripheral seals 33, 33a adjacent to its opposed ends, and a land or positioning portion 34 provided on said piston is slidable in said bore being normally or centrally positioned beneath the cross-bore 26, as shown. Locking grooves 35, 35a are peripherally provided in the switch piston 32 between the land portion 34 and the seals 33, 33a, respectively, and opposed extensions 36, 36a are provided on the switch piston 32 extending into the housing counterbores 22, 22a, said extensions having free end portions defining valve seats 37, 37a. Opposed annular shoulders 38, 38a are defined on the opposed ends of the switch piston 32 at the juncture thereof with the extensions 36, 36a, and it should be noted that said shoulders are predeterminately axially spaced from the housing shoulders 24, 24a.

Since the opposed metering or proportioning members, such as stepped pistons 39, 39a are, for all practical purposes, of identical construction and function in the same manner, only the piston 39 is shown in detail in FIG. 3; however, the corresponding structure or component parts of the piston 39a are also described hereinafter. The proportioning pistons 39, 39a are slidably received in the counterbores 22, 23 and 22a, 23a and provided with spaced peripheral seals 40, 41 and 40a, 41a in sealing engagement with said counterbores 22, 23 and 22a, 23a, respectively. Inlet fluid pressure chambers 42, 42a are defined in the counterbores 22, 22a between the opposed ends of the switch piston 32 and the proportioning pistons 39, 39a in open pressure fluid communication with the inlet ports 29, 29a at all times, and outlet fluid pressure chambers 43, 43a are respectively defined in the counterbores 23, 23a between the closure members 30, 30a and the proportioning pistons 39, 39a in open pressure fluid communication with the outlet ports 31, 31a, respectively. The proportioning pistons 39, 39a are provided with bores 44, 44a interposed between opposed counterbores 45, 45a and 46, 46a which define flow passages between the inlet and outlet chambers 42, 43 and 42a, 43a, and annular shoulders 47, 47a are provided on said proportioning pistons at the junctures of the bores and counterbores 44, 45 and 44a, 45a, respectively. Valve elements or cup-type seals 48, 48a are provided for sealing engagement with the switch piston valve seats 37, 37a and are normally urged into abutting engagement with the proportioning piston shoulders 47, 47a by springs 49, 49a of negligible compressive force, said springs being engaged between said valves and the switch piston extensions 36, 36a. The valves 48, 48a are provided with central apertures 50, 50a therethrough substantially in alignment with the proportioning piston bores 44, 44a and radially outer, annular, lip portions 51, 51a for sealing engagement with the proportioning piston counterbores 45, 45a. A plurality of radially extending grooves 52, 52a are provided in the base portion of the valves 48, 48a and define a return passage for fluid pressure from the outlet chambers 43, 43a through the proportioning piston bores 44, 44a, the valve apertures 50, 50a, said grooves and past the sealing lips 51, 51a of said valves into the inlet chambers 42, 42a when said valves are engaged with the switch member valve seats 37, 37a closing said valve apertures 50, 50a, as will be discussed hereinafter. Proportioning or metering springs 53, 53a are provided in the inlet chambers 42, 42a and are precompressed between the proportioning pistons 39, 39a and retainers 54, 54a which are slidably received on the switch piston extensions 36, 36a and biased into engagement with the switch piston shoulders 38, 38a. Since the proportioning springs 53, 53a are substantially the same strength, it should be noted that said proportioning springs normally urge the proportioning pistons 39, 39a into engagement with the closure members 30, 30a predeterminately spacing the valves 48, 48a from engagement with their seats 37, 37a on the switch piston 32, and said switch piston is biased between said proportioning springs toward its centered or normal position, as shown. Of course, the metering springs 53, 53a could be utilized at their free lengths without such precompressing containment; however, in this event, the additional centering springs of a type well known in the art would be necessary between the proportioning pistons 39, 39a and the closure members 30, 30a.

Annular opposed and equal effective areas $A_1$, $A_{1a}$ are defined on the switch piston 32 substantially between the sealing engagement of the seats 37, 37a with the valves 48, 48a and the sealing engagement of the seals 33, 33a with the housing bore 22, and said areas $A_1$, $A_{1a}$ are subjected to fluid pressure in the inlet chambers 42, 42a, respectively. The switch piston 32 is also provided with annular opposed and equal effective areas $A_2$, $A_{2a}$ which are defined by the sealing engagement of the seats 37, 37a with the valves 48, 48a, said areas $A_2$, $A_{2a}$ being subjected to the fluid pressure in the inlet chambers 42, 42a when said seats and valves are disengaged and being subjected to the fluid pressure in the outlet chambers 43, 43a when said seats and valves are engaged.

Annular effective areas $A_3$, $A_{3a}$ are provided on the proportioning pistons 39, 39a being substantially defined between the sealing engagement of the switch piston seats 37, 37a with the valves 48, 48a and the sealing engagement of the seals 40, 40a with the housing counterbores 22, 22a, and the areas $A_3$, $A_{3a}$ are responsive to fluid pressures in the inlet chambers 42, 42a. Annular effective areas $A_4$, $A_{4a}$ are also provided on the proportioning pistons 39, 39a being substantially defined between the sealing engagement of the switch piston seats 37, 37a with the valves 48, 48a and the sealing engagement of the seals 41, 41a with the housing counterbores 23, 23a, and the areas $A_4$, $A_{4a}$ are responsive to fluid pressures in the outlet chambers 43, 43a. Further, the areas $A_4$, $A_{4a}$ are opposed to and predeterminately greater than the areas $A_3$, $A_{3a}$, respectively.

The electrical switch 28 includes a conductive closure or plug member 55 threadedly and conductively received in the open end of the housing cross-bore 27, and a metal terminal 56 extends through said plug member and is insulated therefrom, said terminal having an exterior end for connection in an electrical circuit of a type well known in the art for selectively energizing a driver warning or dash lamp (not shown). A nonconductive switch operating or follower member 57 is slidably received in a bore 58 provided in the plug member 55, said follower member having a lower end portion extending through the housing cross-bore 26 into engagement with the switch piston land 34, and a conductive contact 59 is provided adjacent to the upper end of said follower member for electrical engagement with another contact 60 on said plug member. A current carrying spring 61 is interposed between the interior end of the terminal 56 and the switch member contact 60 urging the lower end portion or follower end of said follower member 57 into positioning engagement with the switch piston land 34 and urging said switch member contact 51 toward the plug member contact 60.

It should be noted that the distance or travel E between the larger ends of the proportioning pistons 39, 39a and the housing shoulders 25, 25a is greater than twice the distance or travel B, i.e., greater than 2B, between the switch piston seats 37, 37a and piston seats 37, 37a and the valves 48, 48a, respectively, and the travel B is at least equal to or greater than the distance or travel D which is defined by the translatory movement of the switch piston land 34 necessary to permit the displacement of the switch follower member 57 downwardly into locking engagement with one of the locking grooves 35, 35a of the switch piston 32. To complete the description of the control valve 13, it should also be noted that the travels B and D are both greater than the distance or travel C defined between the metering spring retainers 54, 54a and the housing shoulders 24, 24a in order to effect abutment between one of said retainers and one of said shoulders upon the translatory movement of the switch piston 32 in one of its opposite directions toward one of its translated or displaced positions in the event of fluid pressure failure at one of the ports 29, 29a (to be discussed hereinafter).

In the operation with the component parts of the system 1 and control valve 13 positioned as shown in FIGS. 1, 2 and 3, an operator applied force on the split master cylinder 4 establishes separate fluid pressures $P_1$, $P_2$ in the primary and secondary fluid pressure generating chambers thereof (not shown), and for the sake of simplicity, the established fluid pressures $P_1$, $P_2$ are defined as being substantially equal in magnitude. The fluid pressures $P_1$, $P_2$ are respectively transmitted or supplied through conduits 14, 17 to the inlet ports 29, 29a of the control valve 13 flowing therefrom through the inlet chambers 42, 42a, the proportioning piston passages 44, 45, 46 and 44a, 45a, 46a, and the outlet chambers 43, 43a to the outlet ports 31, 31a and therefrom through the conduits 16, 19 to the wheel cylinders 9, 10 and 9a, 10a of the rear brakes 11, 12 to effect energization thereof. At the same time, the fluid pressures $P_1$, $P_2$ are also respectively transmitted from the conduits 14, 17 through the conduits 15, 18 to the wheel cylinders 5, 6 and 5a, 6a of the front brakes 7, 8 to also effect energization thereof. This portion of the braking application is illustrated in the graph of FIG. 4 along the line OT wherein the magnitudes of the fluid pressures $P_1$, $P_2$ at their respective inlet ports 29, 29a and outlet ports 31, 31a are substantially equal or in a substantially 1:1 ratio and less than the predetermined value R on the line OT. Since the fluid pressures $P_1$, $P_2$ are substantially equal throughout the system until they attain the predetermined value R, the fluid pressure $P_1$ in the inlet and outlet chambers 42, 43 acts on the areas $A_1$, $A_2$ of the switch piston 32 therein establishing additive forces $P_1A_1$, $P_2A_2$ which are substantially equal to and opposite additive forces $P_2A_{1a}$, $P_2A_{2a}$ established by the fluid pressure $P_2$ in the inlet and outlet chambers 42a, 43a acting on the areas $A_{1a}$, $A_{2a}$ of said switch piston therein; therefore, said switch piston will remain in its centered position, as shown in FIG. 2, so long as the opposing forces $P_1A_1$, $P_1A_2$, and $P_2A_{1a}$, $P_2A_{2a}$ acting thereon are substantially balanced or equal.

When the magnitudes of the fluid pressures $P_1$, $P_2$ are increased to the predetermined value R on the line OT in the graph of FIG. 4, the fluid pressures $P_1$, $P_2$ in the inlet and outlet chambers 42, 43 and 42a, 43a acting on the opposed differential areas $A_3$, $A_4$ and $A_{3a}$, $A_{4a}$ of the proportioning pistons 39, 39a establish opposed differential forces $P_1A_3$, $P_1A_4$ and $P_2A_{3a}$, $P_2A_{4a}$ which respectively move said proportioning pistons 39, 39a leftwardly and rightwardly against the substantially equal compressive forces Fc and Fca of the metering springs 53, 53a toward isolating positions engaging the valves 48, 48a with the switch piston seats 37, 37a. With the proportioning pistons 39, 39a in their isolating positions engaging the valves 48, 48a with the seats 37, 37a to close the proportioning piston passages 44, 45, 46 and 44a, 45a and 46a, the fluid pressures $P_1$, $P_2$ in the inlet chambers 42, 42a are isolated from the fluid pressures $P_1$, $P_2$ in the outlet chambers 43, 43a and for the sake of clarity, the isolated fluid pressures $P_1$, $P_2$ in the outlet chambers 43, 43a will hereinafter be referred to as isolated or ratioed fluid pressures $P_{1R}$, $P_{2R}$ so long as they remain isolated having magnitudes greater than the predetermined value R. In other words, when the fluid pressures $P_1$, $P_2$ attain the predetermined value R, the forces $P_1A_3$, $P_2A_{3a}$ acting on the proportioning pistons 39, 39a and assisted by the compressive forces Fc, Fca of the metering springs 53, 53a are overcome by the opposing forces $P_{1R}A_4$, $P_{2R}A_{4a}$ established by the isolated fluid pressures $P_{1R}$, $P_{2R}$ acting on the areas $A_4$, $A_{4a}$ of the proportioning pistons 39, 39a in the outlet chambers 43, 43a to maintain said proportioning pistons in their isolated positions, and since the proportioning pistons 39, 39a are moving against the compressive forces Fc, Fca of the metering springs 53, 53a which are substantially equal, as mentioned hereinbefore, the isolated fluid pressures $P_{1R}$, $P_{2R}$ will be substantially equal for all values thereof in excess of the predetermined value R, as shown on the line RV in the graph of FIG. 3; therefore, the isolated fluid pressures $P_{1R}$, $P_{2R}$ acting on the areas $A_2$, $A_{2a}$ of the switch piston 32 in the outlet chambers 43, 43a establish substantially equal and opposite forces $P_{1R}A_2$, $P_{2R}A_{2a}$ which are respectively additive to the substantially equal and opposite forces $P_1A_1$, $P_2A_{1a}$. Hence, it is apparent that the aforementioned forces $P_1A_2$, $P_2A_{2a}$ are replaced by the forces $P_{1R}A_2$, $P_{2R}A_{2a}$ and that the switch piston 32 will remain in its centered position so long as the additive forces $P_1A_1$, $P_{1R}A_2$ are substantially balanced or equal to the additive forces $P_2A_{1a}$, $P_2A_{2a}$. It is also apparent that the compressive forces Fc, Fca of the metering springs 53, 53a are preselected to determine the magnitude of the predetermined value R.

When the fluid pressures $P_1$, $P_2$ are increased along the line OT in the graph of FIG. 3 to a value predeterminately greater than the predetermined value R, the forces $P_1A_3$, $P_2A_{3a}$ acting on the proportioning pistons 39, 39a are correspondingly increased and assisted by the compressive forces Fc, Fca of the metering springs 53, 53a to move said proportioning pistons rightwardly and leftwardly against the opposing forces $P_{1R}A_4$, $P_{2R}A_{4a}$ toward their respective metering or proportioning positions disengaging the valves 48, 48a from the switch piston seats 37. 37a to establish metered or proportioning pressure fluid communication between the inlet and outlet chambers 42, 43 and 42a, 43a. In this manner, the increased fluid pressures $P_1$, $P_2$ are metered from the inlet chambers 42, 42a through the proportioning piston passages 44, 45, 46 and 44a, 45a, 46a into the outlet chambers 43, 43a to effect a metered proportional increase in the isolated fluid pressures $P_{1R}$, $P_{2R}$. When the magnitudes of the isolated fluid pressures $P_{1R}$, $P_{2R}$ are proportionally increased to values wherein the forces $P_{1R}A_4$, $P_{1R}A_{4a}$ again overcome the respective opposing forces $P_1A_3$, $P_2A_{3a}$ assisted by the compressive forces Fc, Fca of the metering springs 53, 53a, the proportioning pistons 39, 39a are again moved against said metering springs to their respective isolating positions reengaging the valves 48, 48a with the switch piston seats 37, 37a to again interrupt pressure fluid communication between the inlet and outlet chambers 42, 43 and 42a, 43a isolating the fluid pressures $P_1$, $P_2$ from the isolated fluid pressures $P_{1R}$, $P_{2R}$, respectively. It should be noticed that the magnitudes of the isolated fluid pressures $P_{1R}$, $P_{2R}$ in excess of the predetermined value R are predeterminately less than that of the fluid pressures $P_1$, $P_2$ in excess of the predetermined value R; therefore, the intensity of the braking application of the rear brakes 11, 12 is proportionally less than or in a predetermined inverse ratio with the intensity of the braking application of the front brakes 7, 8. As mentioned hereinbefore, the switch piston 32 will remain in its centered position since the increased values of $P_1$, $P_2$ above the predetermined value R are substantially equal acting on the substantially equal and opposed areas $A_1$, $A_{1a}$ of said switch piston and the increased values of the isolated fluid pressures $P_{1R}$, $P_{2R}$ in excess of the predetermined value R are also substantially equal acting on the substantially equal and opposed areas $A_2$, $A_{2a}$ of said switch piston, respectively. Of course, the component parts of the control valve 13 are responsive to further increases in the fluid pressures $P_1$, $P_2$ in excess of the predetermined value R to effect further metered increases in the isolated fluid pressures $P_{1R}$, $P_{2R}$ in excess of the predetermined value R for increasing the intensity of the braking application in the same manner as described hereinabove.

When the desired intensity of the braking application has been attained or a complete stop effected, the operator applied force is removed from the split master cylinder 4 to decrease the fluid pressures $P_1$, $P_2$ along the line OT in FIG. 4 and permit the return flow of the displaced pressure fluid. When the fluid pressures $P_1$, $P_2$ are decreased to a magnitude less than that of the isolated fluid pressures $P_{1R}$, $P_{2R}$, i.e., to the value $V'$ on the line OT, for instance, the forces of the isolated fluid pressures $P_{1R}$, $P_{2R}$ acting on the outlet sides of the valves 48, 48a through the grooves 52, 52a therein will overcome the opposing forces of the decreased fluid pressures $P_1$, $P_2$ acting on the inlet sides of said valves to thereby displace the sealing lips 51, 51a of said valves from sealing engagement with the proportioning piston counterbores 45, 45a and open the return passage defined between said valve grooves 52, 52a and the proportioning piston shoulders 47, 47a and also between said valve sealing lips 51, 51a and said proportioning piston counterbores 45, 45a. In this manner, the magnitudes of the isolated fluid pressures $P_{1R}$, $P_{2R}$ are correspondingly reduced along the line VV'R when the fluid pressures $P_1$, $P_2$ are reduced to values less than $V'$ and greater than R on the line OT in the graph of FIG. 3. When the magnitudes of the fluid pressures $P_1$, $P_2$ and the isolated fluid pressures $P_{1R}$, $P_{2R}$ are so reduced to a value less than the predetermined value R, the forces $P_1A_3$, $P_2A_{3a}$ assisted by the compressive forces Fc, Fca of the metering springs 53, 53a overcome the reduced forces $P_{1R}A_4$, $P_{2R}A_{4a}$ to move said proportioning pistons 39, 39a toward their original positions into engagement with the closure members 30, 30a disengaging the valves 48, 48a from the switch piston seats 37, 37a to open the proportioning piston passages 44, 45, 46 and 44a, 45a, 46a and reestablish open pressure fluid communication between the inlet and outlet chambers 42, 43 and 42a, 43a. In this manner, the fluid pressures $P_1$, $P_2$ and the isolated fluid pressures $P_{1R}$, $P_{2R}$ are eliminated and the displaced pressure fluid returns from the wheel cylinders 9, 10 and 9a, 10a of the rear brakes 11, 12 through the conduits 16, 19, the outlet ports 31, 31a, the outlet chambers 43, 43a, the proportioning piston passages 44, 45, 46 and 44a, 45a, 46a, the inlet chambers 42, 42a to the inlet ports 29, 29a and therefrom through the conduits 14, 17 to the split master cylinder 4. Of course, the elimination of the fluid pressures $P_1$, $P_2$ eliminates the opposed and substantially equal forces $P_1A_1$, $P_2A_{1a}$ acting on the switch piston 32 and the forces $P_1A_3$, $P_2A_{3a}$ acting on the proportioning pistons 39, 39a, and the elimination of the isolated fluid pressures $P_{1R}$, $P_{2R}$ eliminates the opposed and substantially equal forces $P_{1R}A_2$, $P_{2R}A_{4a}$ acting on the switch piston 32 and also eliminates the forces $P_{1R}A_4$, $P_{2R}A_{4a}$ acting on the porportioning pistons 39, 39a. At the same time, the displaced pressure fluid also returns from the wheel cylinders 5, 6 and 5a, 6a through conduits 15, 18 and 14, 17 to the split master cylinder 4. In this manner, the elimination of the fluid pressures $P_1$, $P_2$ from the wheel cylinders 5, 6 and 5a, 6a and the substantially simultaneous elimination of the isolated fluid pressures $P_{1R}$, $P_{2R}$ from the wheel cylinders 9, 10 and 9a, 10a effects the substantially simultaneous deenergization of the front and rear brake assemblies 7, 8 and 11, 12.

In the event of the occurrence of an emergency condition, such as the failure of one of the fluid pressures $P_1$, $P_2$ in one of the branch systems 2, 3, due to the malfunction of the fluid pressure generating portion (not shown) of the split master cylinder 4 connected with the failed system branch or other leaks or the like in such failed system branch, it is, of course, obvious that the braking effort of the front and rear brakes 7, 8 and 11, 12 is reduced, and it is desirable to reestablish such braking effort by increasing the fluid pressure in the functioning system branch. Furthermore, it is also desirable to proportion the braking effort between said front and rear brakes in the same maner as previously described upon the reestablishment of the braking effort under such emergency conditions. For instance, when the fluid pressures $P_1$, $P_2$ and $P_{1R}$, $P_{2R}$ are in excess of the predetermined value R and the proportioning pistons 39, 39a are in their isolating positions, as described hereinbefore, assume that the fluid pressure $P_2$ in the system branch 3 fails; therefore, it follows that the wheel cylinders 5a, 6a of the front brakes 7, 8 are deactuated or unavailable to effect normal energization of the front brakes, and the forces $P_2A_{1a}$, $P_2A_{3a}$ acting on the switch and proportioning pistons 32, 39a, respectively, are eliminated. With the fluid pressure $P_2$ eliminated, the isolated fluid pressure $P_{2R}$ acting on the valve 48a displaces the lips 51a from sealing engagement with the counterbore 45a of the proportioning piston 39a to open the return flow passage through the valve grooves 52a and past the valve lips 51a to establish pressure fluid communication between the inlet and outlet chambers 42a, 43a, as previously described; therefore, the displaced pressure fluid is returned through said return passage to also eliminate the isolated fluid pressure $P_{2R}$. Upon the elimination of the fluid pressure $P_{2R}$, the compressive force of the metering spring 53a returns the proportioning piston 39a to its original position in abutting engagement with the closure member 30a, and it follows that the wheel cylinders 9a, 10a of the rear brakes 11, 12 are thereby deactuated or unavailable to effect normal energization of said rear brakes.

Upon the elimination of the fluid pressure $P_2$, the forces $P_1A_1$, $P_{1R}A_2$ acting on the switch piston 32 are effective to displace or effect translatory movement of said switch piston against the metering spring 53a leftwardly in the housing bore 20 toward a leftward displaced or translated position defined by the engagement of the switch piston seat 37a with the proportioning piston valve 48a when the proportioning piston 39a is engaged with the closure member 30a. As previously mentioned, the switch piston seat 37a will travel through the predetermined distance B toward its leftward translated position, and since the predetermined travel C betwen the retainer 54 and housing shoulder 24 is less than the predetermined travel B, the retainer 54 of the metering spring 53 is moved into seating engagement with the housing shoulder 24 and the switch piston shoulder 38 is displaced from said retainer prior to the engagement of the switch piston seat 37a and the proportioning piston valve 48a in the leftward translated position of the switch piston 32. Of course, this leftward translatory movement disengages the switch piston seat 37 from the proportioning piston valve to reestablish pressure fluid communication between the inlet and outlet chambers 42, 43, and the force $P_{1R}A_2$ acting on the switch piston 32 is, of course, replaced by the force $P_1A_2$. Since the switch piston 32 moves through the predetermined travel B toward its leftward translatory position, the travel between the switch piston seat 37 in its leftward translated position and the valve 48 in its normal or original position is increased to a distance equal to 2B; therefore, it also follows that the compressive force Fc of the metering spring 53 engaged between the housing shoulder 24 and the proportioning piston 39 and opposing movement of said proportioning piston to its isolating position is also increased. When the operator applied force on the split master cylinder 4 is increased to increase the magnitude of the fluid pressure $P_1$ to the other predetermined value S on the line OT of FIG. 4 in order to reestablish the desired braking effort under such emergency conditions, the force $P_1A_4$ acting on the proportioning piston overcomes the force $P_1A_3$ assisted by the increased compressive force Fc of the metering spring 53 to move said proportioning piston 39 leftwardly through the travel distance 2B toward its isolating position engaging the valve 48 with the switch piston seat 37. Further increases in the fluid pressure $P_1$ in excess of the predetermined value S will effect metered proportional increases in the isolated fluid pressure $P_{1R}$ along the line SU in the graph of FIG. 4 to provide the desired proportioning of the braking effort between the front and rear brakes 7, 8 and 11, 12, as previously described.

The leftward translatory movement of the switch piston 32 into its leftward translated position also moves the switch piston land 34 leftwardly toward a position disengaging said land from the follower end of the switch operating member 57 and placing the locking groove 35 beneath the housing cross-bore 26. The force of the switch spring 61 thereafter drives the switch operating member 57 downwardly moving the follower end thereof into the housing bore 21 and into locking engagement with the side wall of the locking groove 35 in order to prevent the return of the switch piston 32 to its centered position in response to the force of the metering spring 53a acting thereon, and the downward movement of said switch operating member also engages the contact 59 thereon with the switch contact 60 thereby energizing the switch 28 to complete its electrical circuit and light the dash lamp (not shown) for warning the vehicle operator that a portion of his fluid pressure system 1 has failed. When the defect has been repaired, the switch 28 may be manually removed or threadedly disengaged from the housing cross-bore 27 to remove the follower end of the switch operating member 57 from locking engagement with the switch piston locking groove 35, and the compressive forces Fc, Fca of the metering springs 53, 53a will return said switch piston to its centered position, as shown, wherein the switch may then be manually replaced in its original position.

It is, of course, obvious that the component parts of the control valve 13 will function in the reverse manner as described hereinabove in the event that the fluid pressure $P_1$ in the branch 2 fails wherein the switch piston 32 and proportioning piston 39 are moved to their rightward translated or displaced positions and the proportioning piston 39a functions in response to increased values of the fluid pressures $P_2$ and $P_{2R}$ in excess of the predetermined value S to proportionally meter fluid pressure to the rear brakes 11, 12.

From the foregoing, it is now apparent that a novel control valve 13 meeting the objects and advantageous features set out hereinbefore is provided and that changes or modifications as to the precise connections, shapes or details of the construction set forth in the disclosure by way of illustration may be made by those skilled in the art without departing from the spirit of the invention.

The embodiments of the invention in which an exclusive property or privilege is claimed are defined as follows:

I claim:

1. A control valve comprising a housing having a pair of pressure fluid flow passages therein, means movable between said flow passages from a normally centered position toward opposed translated positions in said housing in response to a predetermined differential between the fluid pressures in said flow passages acting thereon, and a pair of opposed resiliently urged means respectively movable in said flow passages relative to said first named means in its centered position for metering engagement therewith to control the application through said flow passages of the fluid pressures supplied thereto, said resiliently urged means being initially movable in response to supplied and applied fluid pressures of a predetermined value into metering engagement with said first named means in its centered position isolating the supplied and applied fluid pressures and thereafter further movable in response to increases in the supplied fluid pressures in excess of the predetermined value to effect metered increases in the applied fluid pressures in a predetermined ratio with the increased supplied fluid pressures, respectively.

2. The control valve according to claim 1, comprising opposed differential areas on each of said resiliently urged means, the larger of said opposed differential areas being subjected to the applied fluid pressures and the smaller of said opposed differential areas being subjected to the supplied fluid pressures wherein the applied fluid pressures in excess of the predetermined value are less than the supplied fluid pressures in excess of the predetermined value.

3. The control valve according to claim 1, comprising a pair of opposed portions on each of said resiliently urged means respectively defining a pair of opposed differential areas, the larger of said areas being substantially equal and responsive to the applied fluid pressures, and the smaller of said areas also being substantailly equal and responsive to the supplied fluid pressures.

4. The control valve according to claim 3, comprising a pair of passage means in said resiliently urged means between said opposed portions thereof and defining portions of said flow passages, respectively, said passage means being closed to isolate the supplied and applied fluid pressures upon movement of said resiliently urged means into metering engagement with said first named means.

5. The control valve acocrding to claim 4, comprising a pair of valve means in said resiliently urged means controlling said passage means, said valve means being moved with said resiliently urged means into metering engagement with said first named means to close said passage means.

6. The control valve according to claim 5, wherein said valve means define with said resiliently urged means a pair of return flow passages, said valve means being responsive to the supplied fluid pressures less than the applied fluid pressures to establish pressure fluid communication therebetween through said return flow passages when said valve means are engaged with said first named means closing said passage means, respectively.

7. The control valve according to claim 1, comprising a pair of opposed areas on said first named means respectively subjected to the supplied fluid pressures, said first named means being movable from its centered position toward one of its translated positions against one of said resiliently urged means to obviate metering actuation thereof in response to one supplied fluid pressure acting on one of said areas upon the failure of the other supplied fluid pressure acting on the other of said areas, and the other of said resiliently urged means being thereafter movable in response to the one supplied and applied fluid pressures of another predetermined value greater than the first named predetermined value into metering engagement with said first named means isolating the one supplied and applied fluid pressures and further movable in response to increases in the one supplied fluid pressure in excess of the other predetermined value to effect metered increases in the one applied fluid pressure in the predetermined ratio with the increased one supplied fluid pressure in excess of the other predetermined value when said first named means is in its one translated position.

8. The control valve according to claim 7, comprising a pair of abutment means on said housing for engagement with said resiliently urged means, said other resiliently urged means being movable into engagement with one of said abutment means and said first named means being thereafter disengaged from said other resiliently urged means upon the translatory movement of said first named means toward its one translated position.

9. The control valve according to claim 8, comprising a pair of abutments on said housing respectively opposed to and spaced from said pair of abutment means, said resiliently urged means being normally contained in resilient engagement between said abutments and said first named means and said resiliently urged means being displaced from said abutment means against said first named means upon movement toward metering engagement with said first named means when said first named means is in its centered position.

10. The control valve according to claim 9, wherein said abutments also define the opposed translated positions of said first named means, said one resiliently urged means being urged toward engagement with one of said abutment means upon the translatory movement of said first named means against said one resilently urged means toward its one translated position.

11. The control valve according to claim 7, comprising a pair of abutment means on said housing for engagement with said resiliently urged means and defining the opposed translated positions of said first named means, said one resiliently urged means being driven into engagement with one of said pair of abutment means by said first named means upon the translatory movement thereof to its one translated position, and another pair of abutment means on said housing respectively opposed to said first named pair of abutment means for engagement with said resiliently urged means, said other resiliently urged means being movable into engagement with one of said other pair of abutment means and said first named being thereafter disengaged from said other resiliently urged means upon the translatory movement of said first named means toward its one translated position.

12. The control valve according to claim 7, comprising a pair fo passage means in said resiliently urged means and defining portions of said flow passages, a pair of valve means on said resiliently urged means about said flow passages, a pair of opposed extensions on said first named means, and a pair of valve seats on said extension means for metering engagement with said valve means, said valve means being moved into metering engagement with said valve seats upon actuation of said resiliently urged means in response to the supplied and applied fluid pressures of the first named predetermined value when said first named means is in its centered position, one of said valve seats being moved into engagement with one of said valve seats closing one of said passage means upon the translatory movement of said first named means toward its one translated position and the other of said valve means being thereafter moved into metering engagement wiht the other of said valve seats upon actuation of said other resiliently urged means in response to the one supplied and applied fluid pressures in excess of the other predetermined value.

13. The control valve according to claim 12, wherein said valve means define with said resiliently urged means a pair of return flow passages for connection between the supplied and applied fluid pressures, said valve means being responsive to supplied fluid pressures having magnitudes less than the applied fluid pressures to establish pressure fluid communication therebetween through said return flow passages when said valve means are engaged with said valve seats closing said passage means, respectively.

14. The control valve according to claim 12, comprising another pair of opposed areas on said valve seats defined by the engagement of said valve seats and valve means and subjected to the applied fluid pressure, the opposed forces established upon the subjection of said other areas to the applied fluid pressures being respectively additive to the opposed forces established upon the subjection of said first named areas to the supplied fluid pressures.

15. A control valve comprising a housing having a pair of sets of ports therein, each of said port sets including inlet and outlet ports, means movable in said housing between said port sets from a normally centered position toward opposed translated positions in response to a predetermined differential between the fluid pressures at the inlet ports of said port sets, a pair of opposed metering members movable in said housing for metering engagement with said first named means in its centered position to control pressure fluid communication between the inlet and outlet ports of said port sets, and a pair of resilient means engaged between said metering members and said first named means, said metering members being initially movable against the force of said resilient means in response to fluid pressures of a predetermined value at said inlet and outlet ports of said port sets toward positions in metering engagement with said first named means interrupting pressure fluid communication between said inlet and outlet ports of said port sets, said metering members also being thereafter further movable in response to increases in the fluid pressures at said inlet ports of said port sets in excess of the predetermined value and assisted by the forces of said resilient means toward positions disengaged from said first named mean etablishing metered pressure fluid communication between said inlet and outlet ports of said port sets to effect metered increases in the fluid pressures in excess of the predetermined value at said outlet ports of said port sets in a predetermined ratio with the increased fluid pressures in excess of the predetermined value at said inlet ports of said port sets, respectively.

16. The control valve according to claim 15, comprising a pair of passage means in said metering members between said inlet and outlet ports of said port sets, respectively, said passage means being closed upon movement of said metering members into metering engagement with said first named means.

17. The control valve according to claim 16, comprising a pair of valve means in said metering members about said passage means, said valve means being movable with said metering members into metering engagement with said first named means to close said passage means and being movable with said metering members in response to the increased fluid pressures at the inlet ports of said port sets and assisted by the forces of said resilient means toward positions disengaged from said first named means to establih metered pressure fluid communication between the inlet and outlet ports of said port sets through said passage means.

18. The control valve according to claim 17, comprising a pair of valve seats on said first named means for engagement with said valve means.

19. The control valve according to claim 18, wherein said valve means defines with said metering members a pair of return flow passages, said valve means being responsive to fluid pressure at said inlet ports of said port sets less than that at the outlet ports of said port sets to established pressure fluid communication therebetween through said return flow passages when said valve means are engaged with said valve seats closing said passage means, respectively.

20. The control valve according to claim 15, comprising opposed differential areas on each of said metering members, the larger of said opposed differential areas being subjected to the fluid pressures at the outlet ports of said port sets and the smaller of said areas being subjected to the fluid pressures at the inlet ports of said port sets wherein the fluid pressures at the outlet ports of said port sets in excess of the predetermined valve are less than the fluid pressures at the inlet ports of said port sets in excess of the predetermined value.

21. The control valve according to claim 15, comprising a pair of opposed areas on said first named means respectively subjected to the fluid pressures at said inlet ports of said port sets, said first named means being movable from its centered position in response to the fluid pressure at said inlet port of one of said port sets acting on one of said opposed areas upon the failure of the fluid pressure at the inlet port of the other of said port sets acting on the other of said areas toward one of its translated positions against one of said resilient means and one of said metering members to obviate metering actuation thereof, and the other of said metering members being thereafter movable against the other of said resilient means in response to the fluid pressure at the inlet port of said one port set of a predetermined value greater than said first named predetermined value into metering engagement with said first named means interrupting pressure fluid communication between the inlet and outlet ports of said one port set and further movable in response to increases in the fluid pressure at said inlet port of said one port set in excess of the other predetermined value and assisted by the force of said other resilient means toward a position disengaged from said first named means to establish pressure fluid communication between said inlet and outlet ports of said one port set and effect metered increases in the fluid pressure at said outlet port of said one port set in the predetermined ratio with the increased fluid pressure in excess of the other predetermined value at said inlet port of said one port set, respectively.

22. The control valve according to claim 21, comprising a pair of abutments on said housing, said other resilient means being movable in response to the force thereof into engagement with one of said abutments for containment between said other metering member and said one abutment and said first named means being thereafter disengaged from said other resilient means upon the translatory movement of said first named means toward its one translated position.

23. The control valve according to claim 22, comprising a pair of abutment means on said housing respectively opposed to and spaced from said pair of abutments, said resilient means normally urging said metering members into engagement with said abutment means and said metering members being displaced from said abutments against said resilient means and first named means upon movement toward metering engagement with said first named means when said first named means is in its centered position.

24. The control valve according to claim 23, wherein said abutment means also define the opposed translated positions of said first named means, the force of said one resilient means urging said one metering member toward engagement with one of said abutment means upon the translatory movement of said first named means against said one resilient means and said one metering member toward its one translated position.

25. The control valve according to claim 21, comprising a pair of abutment means on said housing for engagement with said metering members and defining the opposed translated positions of said first named means, the force of said one resilient means urging said one metering member into engagement with one of said abutment means upon the translatory movement of said first named means against said one resilient means and metering member toward its one translated position, and a pair of abutments on said housing respectively opposed to and spaced from said abutment means for engagement with said resilient means, said other resilient means being expandable in response to the force thereof into engagement with one of said abutments for containment between said one abutment and said other metering member and said first named means being thereafter disengaged from said other resilient means upon the translatory movement of said first named means toward its one translated position.

26. The control valve according to claim 21, comprising a pair of passage means in said metering members between said inlet and outlet ports of said port sets, a pair of valve means on said metering members about said passage means, a pair of opposed extensions on said first named means, and a pair of valve seats on said extension means for respective engagement with said valve seats, said valve means being moved into metering engagement with said valve seats to interrupt the pressure fluid communication between the inlet and outlet ports of said port sets upon actuation of said metering members in response to the fluid pressures at the inlet and outlet ports of said port sets of the first named predetermined value and being moved to positions disengaged from said valve seats to effect the metered increases in the fluid pressures at the outlet ports of said port sets upon actuation of said metering members in response to the increased fluid pressures in excess of the first named predetermined value and assisted by the forces of said resilient means when said first named means is in its centered position, one of said valve seats being moved into engagement with one of said valve means closing one of said passage means to obviate metered pressure fluid communication therethrough between the inlet and outlet ports of the other of said port sets upon the tanslatory movement of said first named means from its centered position to its one translated position against the force of said one resilient means and said one metering member, a pair of abutment means on said housing for engagement with said resilient means, said other resilient means being movable into engagement with one of said abutment means for containment between said one abutment means and said other metering member and said first named means being thereafter disengaged from said other resilient means upon the translatory movement of said first named means toward its one translated position, and the other of said valve means being thereafter moved into metering engagement with the other of said valve seats interrupting pressure fluid communication between the inlet and outlet ports of said other port set upon the actuation of said other metering member against the force of said other resilient means contained between said one abutment and said other metering member in response to the fluid pressure at the inlet and outlet ports of said other port sets of the other predetermined value and being further movable to a position disengaged from said other valve seat to effect the metered increases in the fluid pressure in excess of the other predetermined value at the outlet port of said other port set upon actuation of said other metering member in response to the increases in the fluid pressure in excess of the other predetermined value at said inlet port of said other port set and assisted by the force of said other resilient means contained between said one abutment means and said other metering member when said first named means is in its one translated position.

27. A control valve comprising a housing having a pair of fluid pressure inlet chambers and a pair of fluid pressure outlet chambers therein, means movable in said housing between said inlet chambers from a normally centered position toward opposed translated positions, a pair of metering members movable in said housing between one of said inlet and outlet chambers and the other of said inlet and outlet chambers, respectively, a pair of resilient means in said inlet chambers engaged between said members and said first named means, respectively, a pair of passages in said members respectively connected between said one and other inlet and outlet chambers, a pair of valve means in said members controlling pressure fluid communication between said one and other inlet and outlet chambers, a pair of valve seats on said first named means for engagement with said valve seats, first and second opposed areas on one of said members respectively subjected to fluid pressure in said one inlet and outlet chambers, third and fourth opposed areas on the other of said members respectively subjected to fluid pressure in said other inlet and outlet chambers, said first and third areas being substantially equal and predeterminately less than said second and fourth areas and said second and fourth areas also being substantially equal, said members being initially movable against said resilient means and said first named means in its centered position in response to fluid pressures of a predetermined value in said one inlet and outlet chambers acting on said first and second areas and in said other inlet and outlet chambers acting on said third and fourth areas toward positions engaging said valve means with said valve seats closing said connecting passages and thereafter further movable in response to increases in the fluid pressure in said one and other inlet chambers acting on said first and third areas toward positions disengaging said valve means from said valve seats to meter fluid pressure through said connecting passages and effect metered increases in the fluid pressures in excess of the predetermined value in said one and other outlet chambers acting on said second and fourth areas in a predetermined ratio with the increased fluid pressures in excess of the predetermined value in said one and other inlet chambers, respectively, fifth and sixth opposed substantially equal areas on said first named means respectively subjected to the fluid pressures in said one and other inlet chambers, said first named means being movable from its centered position in response to the fluid pressure in one of said one and other inlet chambers acting on one of said fifth and sixth areas upon the failure of the fluid pressure in the other of said one and other inlet chambers acting on the other of said fifth and sixth areas toward one of its opposed translated positions against one of said resilient means and one of said one and other members to obviate metering actuation thereof, a pair of abutment means on said housing for engagement with said resilient means, the other of said resilient means being movable into engagement with one of said abutment means for containment between said one abutment means and the other of said one and other members and said first named means being thereafter disengaged from said other resilient means upon the translatory movement of said first named means toward its one translated position, and said other of said one and other members being thereafter movable against said other resilient means when it is engaged with said one abutment means in response to fluid pressure in said one of said one and other inlet and outlet chambers of another predetermined value greater than said first named predetermined value acting on one of said first and third areas and one of said second and fourth areas to engage one of said valve means with one of said valve seats closing one of said connecting passages and also being further movable in response to increases in the fluid pressure in said one of said one and other inlet chambers in excess of the other predetermined value acting on said one of said first and third areas and assisted by the force of said other resilient means toward a position disengaging said one valve means from said one valve seat to meter fluid pressure through said one connecting passage and effect metered increases in the fluid pressure in excess of the other predetermined value in said one of said one and other outlet chambers acting on one of said second and fourth areas in the predetermined ratio with the increased fluid pressure in excess of the other predetermined value in said one of said one and other inlet chambers, respectively.

28. A control valve comprising a housing, a bore in said housing interposed between first and second stepped counterbores, and third and fourth stepped counterbores, a pair of closure members retained in said housing against displacement from said second and fourth counterbores, first and second outlet ports in said closure members connecting with said second and fourth counterbores, first and second inlet ports in said housing connected with said first and third counterbores, a first piston slidable in said bore from a normally centered position toward opposed translated positions, first and second opposed end portions on said first piston and extending into said first and third counterbores, first and second opposed reduced extensions on said first piston respectively connected to said first and second opposed end portions and extending into said first and third counterbores, first and second valve seats defined on the free ends of said first and second reduced extensions in said first and third counterbores, first and second opposed shoulders on said first piston at the junctures of said opposed first and second extensions and said first and second end portions, a second piston slidable in said first counterbore and having a first flange thereon slidable in said third counterbore, a third end portion on said second piston defining a first fluid pressure responsive area in said first counterbore, a fourth end portion on said first flange opposed to said third end portion defining a second fluid pressure responsive area in said second counterbore opposed to and predeterminately greater than said first area, a third piston slidable in said third counterbore and having a secon flange thereon slidable in said fourth counterbore, a fifth end portion on said third piston defining a third fluid pressure responsive area in said third counterbore substantially equal to said first area, a sixth end portion on said second flange opposed to said fifth end portion and defining a fourth fluid pressure responsive area in said fourth counterbore opposed to and predeterminately greater than said third area and substantially equal to said second area, a first passage in said second piston between said third and fourth end portions, first valve means in said second piston for engagement with said first valve seat and controlling said first passage, a second passage in said third piston between said fifth and sixth opposed ends, second valve means in said third piston for engagement with said second valve seat and controlling said second passage, a first retainer movable on said first extension for engagement with said first shoulder, a first spring contained between said third end portion and said first retainer urging said first retainer toward said first shoulder and urging said fourth end portion toward said first closure member to predeterminately space said first valve means from said first valve seat, a second retainer movable on said second extension for engagement with said second shoulder, a second spring contained between said fifth end portion and said second retainer urging said second retainer toward said second shoulder and urging said sixth end portion toward said second closure member to predeterminately space said second valve means from said second valve seat, said second and third pistons being initially movable against said first and second springs and said first piston in its centered position in response to flud pressures of a predetermned value at said first and second inlet and outlet ports acting on said first and second areas and on said third and fourth areas toward positions engaging said first and second valve means with said first and second valve seats closing said first and second passages to interrupt pressure fluid communication between said first and second inlet and outlet ports and said second and third pistons being thereafter further movable in response to increases in the fluid pressures at said first and second inlet ports in excess of the predetermined value acting on said first and third areas and assisted by the force of said first and second springs toward positions disengaging said first and second valve means from said first and second valve seats to meter fluid pressure through said first and second passages and effect metered increases in the fluid pressures at said first and second outlet ports in excess of the predetermined value acting on said second and fourth areas in a predetermined ratio with the increased fluid pressures in excess of the predetermined value at said first and second inlet ports, respectively, fifth and sixth opposed and substantially equal fluid pressure responsive areas on said first piston respectively subjected to the fluid pressures at said first and second inlet ports, said first piston being movable from its centered position in response to the fluid pressure at one of said first and second inlet ports acting on one of said fifth and sixth areas upon the failure of the fluid pressure at the other of said first and second inlet ports acting on the other of said fifth and sixth areas toward one of its opposed translated positions against one of said first and second springs to urge one of said second and third pistons toward engagement with one of said first and second closure members to obviate metering actuation of said one of said second and third pistons, third and fourth opposed shoulders on said housing at the junctures of said bore with said first and third counterbores for engagement with said first and second retainers, the other of said first and second springs being expandable in response to its own force into engagement with one of said third and fourth shoulders for containment between said one of said third and fourth shoulders and the other of said second and third pistons and said first piston being thereafter disengaged from said one of said first and second springs when it is engaged with said one of said third and fourth shoulders upon the translatory movement of said first piston toward its one translated position, and said other of said second and third pistons being thereafter movable against said other of said first and second springs when it is engaged with said one of said third and fourth shoulders in response to fluid pressure at said one of said first and second inlet ports and one of said first and second outlet ports of another predetermined value greater than said first named predetermined value acting on one of said first and third areas and one of said second and fourth areas to engage one of said first and second valve means with one of said first and second valve seats closing one of said first and second passages and also being further movable in response to increases in the fluid pressure at said one of said first and second inlet ports in excess of the other predetermined value acting on said one of said first and third areas and assisted by the force of said other of said first and second springs toward a position disengaging said one of said first and second valve means from said one of said first and second valve seats to meter fluid pressure through said one of said first and second passages and effect metered increases in the fluid pressure in excess of the other predetermined value at said one of said first and second outlet ports acting on said one of said second and fourth areas in the predetermined ratio with the increased fluid pressure in excess of the other predetermined value at said one of said first and second inlet ports, respectively.

29. The control valve according to claim 1, wherein said pair of resiliently urged means include a pair of opposed proportioning members, and a pair of resilient means normally contained in force transmitting engagement between said proportioning members and said first named means, respectively, said proportioning members being initially movable against the forces of said resilient means in response to the supplied and applied fluid pressures of the predetermined value acting thereon into metering engagement with said first named means in its centered position isolating the supplied and applied fluid pressures and said proportioning members being thereafter further movable in response to increases in the supplied fluid pressures in excess of the predetermined value and assisted by the forces of said resilient means to effect the metered increases in the applied fluid pressures in the predetermined ratio with the increased supplied fluid pressures in excess of the predetermined value, respectively.

30. The control valve according to claim 29, wherein said first named means is movable from its centered position toward one of its translated positions against the force of one of said resilient means upon the failure of one of the supplied fluid pressures acting thereon, a pair of abutment means on said housing for respective engagement with said resilient means, the other of said resilient means being movable into engagement with one of said abutment means and said first named means being thereafter disengaged from said other resilient means upon the movement of said first named means toward its one translated position.

31. The control valve according to claim 30, wherein said one and other resilient means include one and other springs each having opposed ends, one of said opposed ends of said one and other springs being respectively engaged with said proportioning members, and a pair of retainer means normally urged into abutting engagement between the other of said opposed ends of said one and other springs and said first named means and including portions for engagement with said abutment means, respectively, the force of said other spring urging said portion of one of said retainer means into abutting engagement with said one abutment means and said first named means being thereafter disengaged from said one retainer means upon the movement of said first named means toward its one translated position.

32. The control valve according to claim 29, comprising a pair of opposed areas on said first named means respectively subjected to the supplied fluid pressures, said first named means being movable from its centered position toward one of its translated positions in response to one of the supplied fluid pressures acting on one of said areas upon the failure of the other supplied fluid pressure acting on the other of said areas against the force of one of said resilient means to obviate the metering actuation of one of said proportioning members, a pair of abutment means on said housing for respective engagement with said resilient means, the other of said resilient means being movable into engagement with one of said abutment means upon the movement of said first named means toward its one translated position, and the other of said proportioning members being thereafter movable against the force of said other resilient means in response to the one supplied and applied fluid pressures of another predetermined value greater than the first named predetermined value into metering engagement with said first named means in its one translated position isolating the one supplied and applied fluid pressures and said other proportioning member also being further movable in response to increases in the one supplied fluid pressure in excess of the other predetermined value and assisted by the force of said other resilient means to effect metered increases in the one applied fluid pressure in the predetermined ratio with the increased one supplied fluid pressure in excess of the other predetermined value.

References Cited

UNITED STATES PATENTS

| 1,993,790 | 3/1935 | Kinsella | 137—101 XR |
| 2,291,229 | 7/1942 | Johnson | 137—101 |
| 2,643,664 | 6/1953 | Willett | 137—101 |
| 3,374,322 | 3/1968 | Miller | 200—82 |

MILTON BUCHLER, *Primary Examiner.*

JOHN J. McLAUGHLIN, JR., *Assistant Examiner.*

U.S. Cl. X.R.

60—54.5; 137—99, 101; 188—151, 152; 200—82; 303—84